United States Patent [19]
Lesesky et al.

[11] Patent Number: 6,111,524
[45] Date of Patent: Aug. 29, 2000

[54] SYSTEMS AND METHODS FOR IDENTIFYING TRACTOR/TRAILERS AND COMPONENTS THEREOF

[75] Inventors: Alan C. Lesesky, Charlotte, N.C.; Bobby Ray Weant, Rock Hill, S.C.

[73] Assignee: Vehicle Enhancement Systems, Inc., Rock Hill, S.C.

[21] Appl. No.: 08/594,255

[22] Filed: Jan. 30, 1996

Related U.S. Application Data

[63] Continuation-in-part of application No. 08/554,907, Nov. 9, 1995, abandoned.

[51] Int. Cl.$^7$ .................................................. G08G 1/04
[52] U.S. Cl. ..................... 340/942; 340/928; 340/933; 340/825.54; 359/142; 359/143
[58] Field of Search .................. 340/928, 933, 340/942, 555, 556, 825.31, 825.54, 825.69, 825.72; 359/142, 143; 235/384

[56] References Cited

U.S. PATENT DOCUMENTS

| | | |
|---|---|---|
| 2,379,664 | 7/1945 | Stanko . |
| 2,483,815 | 10/1949 | Easton . |
| 3,154,360 | 10/1964 | Plishner . |
| 3,184,703 | 5/1965 | Piscitello et al. . |
| 3,387,606 | 6/1968 | Crafts et al. . |

(List continued on next page.)

FOREIGN PATENT DOCUMENTS

| | | |
|---|---|---|
| 0546370A1 | 6/1993 | European Pat. Off. . |
| 52-33092 | 3/1977 | Japan . |
| WO 94/12962 | 6/1994 | WIPO . |

OTHER PUBLICATIONS

IEEE Spectrum, vol. 31, No. 6, Jun. 1994, pp. 49–55.
Echelon's LonWorks Products Data Book, 1995–1996 Edition.
Echelon's LonWorks Custom Node Development, LonWorks Engineering Bulletin dated Apr. 1993.
Serial Data Communications Between Microcomputer Systems In Heavy Duty Vehicle Applications—SAE J1708 Jun. 1987.
English translation of: Sayegrih et al., Transmission de données et d'informations intra–véhicule. Technique par étalement de spectre, *L'Onde Electrique*, vol. 73, No. 3, pp. 42–46, May–Jun. 1993.
Society of Automotive Engineers, Inc., SAE J560 Specification, Jun. 1993.
System 86 Products Train Applications, Specification Manual from Morrison Knudsen, Morrison Knudsen's Advanced Systems Division, pp. 2–3, 13, 40, Dec. 31, 1994.
"Communications Engineers Reference Book," edited by Fraidoon Mazda, Buttersworth–Heineman, 1$^{st}$ Ed. 1993.
PCT International Search Report, PCT/US96/16580, Mar. 13, 1997.

*Primary Examiner*—Daniel J. Wu
*Attorney, Agent, or Firm*—Alston & Bird LLP

[57] ABSTRACT

A vehicle identification system is provided that has a vehicle, preferably including a tractor and a trailer mechanically connected to the tractor and a wavelength carrier communicator connected to the vehicle for producing an identification signal representing an identity of the vehicle. The identification signal preferably includes an optical wavelength carrier signal such as an infrared wavelength carrier signal. External to the vehicle, an identity of the vehicle is determined from the optical identification signal. The optical identification signal may be produced from an indicator mounted on the vehicle, preferably from an indicator which includes an indicator housing having a form factor similar to a standard truck light. In a standalone embodiment, an identification signal representing an identity of the vehicle is generated within the indicator and an optical identification signal is produced from the generated identification signal by an optical transmitter retained within the indicator. In a networked embodiment, the identification signal is generated elsewhere on the vehicle and communicated to an optical transmitter retained within the indicator which produces the optical identification signal from the communicated identification signal.

34 Claims, 7 Drawing Sheets

U.S. PATENT DOCUMENTS

| | | | |
|---|---|---|---|
| 3,705,986 | 12/1972 | Sanders et al. | 359/158 |
| 4,041,470 | 8/1977 | Slane et al. . | |
| 4,104,630 | 8/1978 | Chasek | 342/44 |
| 4,207,468 | 6/1980 | Wilson | 250/341 |
| 4,236,255 | 11/1980 | Burgener et al. | 455/603 |
| 4,287,505 | 9/1981 | Ohmori et al. . | |
| 4,313,228 | 1/1982 | Berstein | 455/617 |
| 4,325,146 | 4/1982 | Lennington | 340/825.54 |
| 4,398,172 | 8/1983 | Caroll et al. | 340/942 |
| 4,624,472 | 11/1986 | Stuart et al. . | |
| 4,641,322 | 2/1987 | Hasegawa | 375/1 |
| 4,715,012 | 12/1987 | Mueller, Jr. . | |
| 4,733,919 | 3/1988 | Jacobs et al. . | |
| 4,735,461 | 4/1988 | Moller et al. . | |
| 4,752,899 | 6/1988 | Newman et al. . | |
| 4,767,181 | 8/1988 | McEowen . | |
| 4,772,209 | 9/1988 | Muncey . | |
| 4,804,938 | 2/1989 | Rouse et al. | 340/310 A |
| 4,809,177 | 2/1989 | Windle et al. . | |
| 4,838,797 | 6/1989 | Dodier . | |
| 4,839,531 | 6/1989 | Stemmons et al. . | |
| 4,864,589 | 9/1989 | Endo | 375/1 |
| 4,897,642 | 1/1990 | DiLullo et al. | 340/825.06 |
| 4,926,170 | 5/1990 | Beggs et al. | 340/904 |
| 4,969,839 | 11/1990 | Nilsson . | |
| 5,025,253 | 6/1991 | DiLullo et al. | 340/825.06 |
| 5,090,024 | 2/1992 | Vander Mey et al. | 375/1 |
| 5,142,278 | 8/1992 | Moallemi et al. | 340/825.06 |
| 5,263,046 | 11/1993 | Vander Mey | 375/1 |
| 5,268,666 | 12/1993 | Michel et al. | 340/310 R |
| 5,278,862 | 1/1994 | Vander Mey | 375/1 |
| 5,359,625 | 10/1994 | Vander Mey et al. | 375/1 |
| 5,397,924 | 3/1995 | Gee et al. | 307/9.1 |
| 5,442,810 | 8/1995 | Jenquin | 455/66 |
| 5,488,352 | 1/1996 | Jasper . | |
| 5,677,667 | 10/1997 | Lesesky et al. . | |
| 5,739,592 | 4/1998 | Rigsby et al. . | |
| 5,900,803 | 5/1999 | Politz et al. . | |

SYSTEMS AND METHODS FOR IDENTIFYING TRACTOR/TRAILERS AND COMPONENTS THEREOF

RELATED APPLICATION

This is a continuation-in-part of U.S. application Ser. No. 08/554,907 filed Nov. 9, 1995 now abandoned.

FIELD OF THE INVENTION

This invention relates generally to data communications for a vehicle and, more specifically, to systems and associated methods for communicating data from a vehicle such as a tractor/trailer to an external location.

BACKGROUND OF THE INVENTION

The trucking industry has for many years used tractor/trailer combinations to transport cargo over the roadways to intended destinations. As shown in FIG. 1, an ensemble of components, including a tractor 10 and a trailer 20 mechanically coupled together so that the tractor can pull the trailer, form a vehicle 5, often referred to as a "rig," which can transport cargo in an efficient and cost effective manner. Various links between the tractor and the trailer provide vehicle subsystems with power and/or control signals to operate. Hydraulic, pneumatic, electrical, and other subsystems on the rig have associated electrical conductors and pneumatic lines running therebetween so these subsystems can operate. These electrical conductors and pneumatic lines typically include quick-disconnecting, standardized connectors and couplers so that rig components, such as tractors, trailers and dollies (the short trailers used to couple multiple trailer strings), may be easily interchanged.

Because connections in rigs are standardized, a single tractor may be connected to and used to transport any number of different trailers throughout its operational life. Because of this interchangeability, components are frequently traded, loaned, and leased among users. For example, a trailer may be hauled to a first terminal or other delivery location where it is detached from the tractor which delivered it and connected to another tractor—the new rig destined for another terminal. Thus, a single trailer may be under the control of several different concerns, including trucking companies, railroads, overseas shippers, and truck brokers, and may be used by several different tractor/trailer operators. The same is true for other components, such as tractors, dollies, and shipping containers.

Because of the interchangeability and mobility of these components, trucking companies, freight brokers, law enforcement officials, and others involved in the transport industry have developed methods to track rigs and their components. While trucking companies and other shippers desire to keep track of cargoes and rolling stock, law enforcement and other regulatory agencies desire to monitor truck licensing, ownership, cargo content, and driver workloads. Techniques have been developed for tracking rigs and their components as the rigs travel between cargo terminals, delivery points, weigh stations, and the like, but these techniques generally are cumbersome and limited in effectiveness and information capacity.

Many tractors, trailers, and other components are identified using simple numbering systems, i.e., a serial or other number is painted on or otherwise applied to a surface of the component. These numbers typically are read and recorded by human operators—a time-consuming process which represents an undesirable inefficiency in an industry in which time is usually critical. Besides being inefficient, the human link in the accounting process increases the chances for error and omission, particularly under conditions of darkness or obscured visibility.

In addition, a serial or other identification number may fail to convey a complete identity. For example, the cargo contained within a trailer generally is not identifiable by the trailer's identification number absent a predetermined cross-reference between the number and the cargo. Although such a cross-reference typically can be supplied through a freight management database, elaborate communications systems and recording procedures may be required to ensure data integrity. Failures in the human link of the accounting chain may result in erroneous component and cargo designations leading to confused shipments and misplaced components.

Bar-code or magnetic-stripe identification systems reduce the human error involved in the use of numbering systems, but have drawbacks of their own. Because of the need to make bar codes or magnetic stripes accessible to readers, codes and stripes are typically affixed to surfaces of the rig which are exposed to wind, rain, salt, and other environmental contaminants which may render the codes or stripes unreadable. In addition, reading a bar code or magnetic stripe typically requires close proximity between the reader and the code or stripe, generally precluding remote reading or reading while the rig is in motion. Moreover, bar codes and magnetic stripes have a relatively limited informational capacity.

In sum, there is a need for improved systems and methods for identifying rigs and their components which have a high information transfer capacity and which can dependably and accurately operate in the demanding environments in which the rigs typically operate. Moreover, these systems and methods should be inexpensive and easily retrofitted onto existing equipment without major compatibility problems.

SUMMARY OF THE INVENTION

In view of the foregoing, it is an object of the present invention to provide improved vehicle identification systems and methods for identifying tractor/trailer rigs and components thereof.

It is another object of the present invention to provide improved vehicle identification systems and methods which are accurate under low light and other visibility-obscuring conditions.

It is another object of the present invention to provide improved vehicle identification systems and methods which are resistant to electromagnetic interference.

It is another object of the present invention to provide improved vehicle identification systems and methods which may remotely identify a tractor/trailer rig and components thereof.

It is another object of the present invention to provide improved vehicle identification systems and methods which may identify a tractor/trailer rig and components thereof when the tractor/trailer rig is in motion.

It is another object of the present invention to provide improved vehicle identification systems and methods which may be easily and inexpensively retrofitted on existing equipment.

It is another object of the present invention to provide improved vehicle identification systems and methods using equipment which is packaged to be inconspicuous and less vulnerable to theft and vandalism.

These and other objects, features and advantages of the present invention are provided by vehicle identification systems and methods in which an optical identification signal representing an identity of a vehicle, preferably a tractor/trailer rig, is produced by optical wavelength carrier communicating means located on the vehicle, from which an identity of the vehicle may be determined using identity determining means positioned external to the vehicle. The optical identification signal includes an optical wavelength carrier signal, preferably from the infrared portion of the optical spectrum. Preferably, the optical wavelength carrier communicating means includes identification signal generating means for generating an identification signal representing an identity of the vehicle and an optical transmitter for producing the optical identification signal. The identification system may further comprise an indicator in which the optical transmitter may be retained with the indicator including means for mounting the indicator on the vehicle. Preferably, the indicator, such as an existing marker or lamp on a trailer or a tractor, preferably includes an indicator housing which includes means for retaining the optical transmitter within the indicator such that the optical transmitter is concealed. More preferably, the indicator housing preferably has an inconspicuous standard truck light form factor similar to the running or clearance lights commonly used on vehicles.

The present invention thus provides rapid and accurate identification of a vehicle without requiring the intervention of a human operator who has high associated labor costs and is prone to error. Unlike identification systems which require close proximity to the vehicle, such as bar code and magnetic stripe systems, the present invention provides for remote identification and identification when the vehicle is moving at high rates of speed and during periods of darkness or obscured visibility. A reasonable range for identification is provided, even under conditions of rain, fog, and mist, without the interference and regulatory concerns which are often attendant to radio frequency communications techniques. Concealing the optical transmitter within a standard form factor indicator renders the identification system less conspicuous and less vulnerable to damage and theft.

In particular, a vehicle identification system according to the present invention includes a vehicle, preferably including a tractor and a trailer mechanically connected thereto. Optical wavelength carrier communicating means located on the vehicle produces an optical identification signal representing an identity of the vehicle. The optical identification signal includes an optical wavelength carrier signal. Preferably, the optical wavelength carrier signal includes a near infrared wavelength carrier signal, more preferably an optical wavelength carrier signal having a wavelength between 700 nanometers and 1400 nanometers. Identity determining means positioned external to the vehicle determine an identity of the vehicle from the optical identification signal.

The optical wavelength carrier communicating preferably includes identification signal generating means for generating an identification signal representing an identity of the vehicle and an optical transmitter which produces an optical identification signal from the generated identification signal. The optical transmitter preferably includes an array of optical emitting diodes and a modulator which modulates the diode array to produce the optical identification signal. The array of optical emitting diodes preferably includes infrared emitting diodes, more preferably gallium aluminum arsenide infrared emitting diodes having peak gain for wavelengths between approximately 700 nanometers and approximately 1400 nanometers.

According to a "Standalone ID Tag" aspect of the present invention, the indicator includes an indicator housing which retains the identification signal generating means and the optical transmitter within the indicator. The resulting combination provides a simple, low-cost "tag" for identifying a vehicle or component. The tag may be easily connected to a power bus, for example, using an existing running or clearance light location. Existing equipment may thus be easily and inexpensively retrofitted with such standalone tags.

According to a "Networked ID Tag" aspect of the present invention, the indicator housing retains the optical transmitter within the indicator. The optical transmitter produces an optical identification signal from an identification signal supplied over a twisted-pair wire, power bus, or other communications bus from identification signal generating means located elsewhere on the vehicle. For example, the identification signal may be produced by a component of the vehicle, such as a tractor, trailer, or dolly and supplied to the optical transmitter over a power bus using power line carrier techniques. The identification signal may also conform to SAE J1708 or other data communications standards.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF ILLUSTRATED EMBODIMENTS

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

Figure 1:
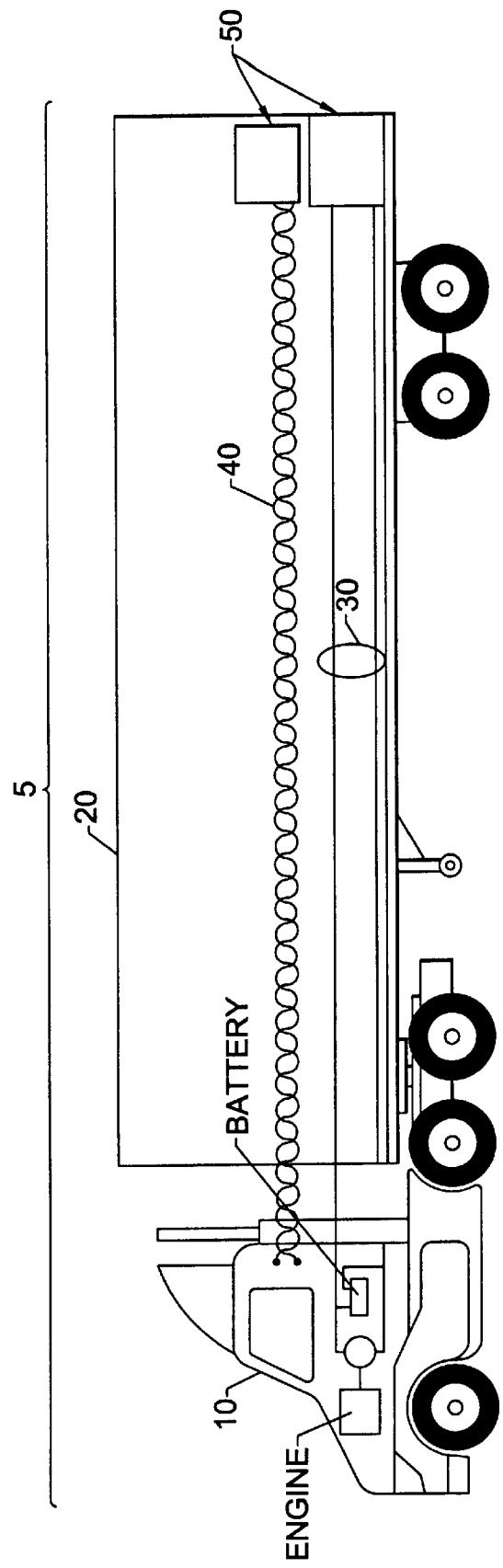
FIG. 1 graphically illustrates a tractor/trailer rig according to the prior art.

Referring to FIG. 1, electrical subsystems of a tractor/trailer vehicle or rig 5 typically include a power bus 30 electrically connected to one or more batteries 32, which are typically charged by an alternator 34 mechanically driven by a tractor engine 15, distributing electrical power from tractor 10 to subsystems throughout the vehicle 5. In addition to the power bus 30, the rig may include a communication bus 40 used to communicate data between various subsystems 50 of the rig. The Society of Automotive Engineers (SAE) has established various standards for communication busses in tractor/trailers. For example, the recommended practice of SAE J1708 defines serial communications for signals in heavy-duty vehicles using a twisted-pair wire driven under electrical parameters similar to IEEE RS-485, along with message formats and reserved addresses for such a system. SAE J1708 is described in the publication "*Surface Vehicle Recommended Practice, Serial Data Communications Between Microcomputer Systems in Heavy Duty Vehicle Applications,*" published by the Society of Automotive Engineers, Oct. 5, 1995, the entirety of which is herein incorporated by reference.

Power bus 30 may also serve as a communications bus. For example, a data-modulated carrier signal may be superposed on the power bus 30 by inductive or capacitive coupling. Communications over the power bus 30 may employ spread spectrum techniques such as the spread spectrum technology embodied in integrated circuits and components (i.e., Intellon SSC PLCEFN, XCR38149PRO2, QHCK-9409 integrated circuit or CEBus-compliant communications modules according to EIA RS-232 and ISA bus module standards) of the Intellon Spread Spectrum Carrier of the Intellon Corporation of Ocala, Fla. which are hereby incorporated herein in its entirety by reference. As understood by those skilled in the art, a spectrum (e.g., 100–400 Khz) of frequencies for data communications allows the signal to be communicated in a manner over the power line which significantly reduces the interference or suppression of the received signal by other electromechanical systems in the tractor/trailer, such as the alternator. In addition to twisted-pair and power line carrier communications techniques, other techniques such as fiber optic or radio frequency (RF) communications techniques may be used.

Figure 2:
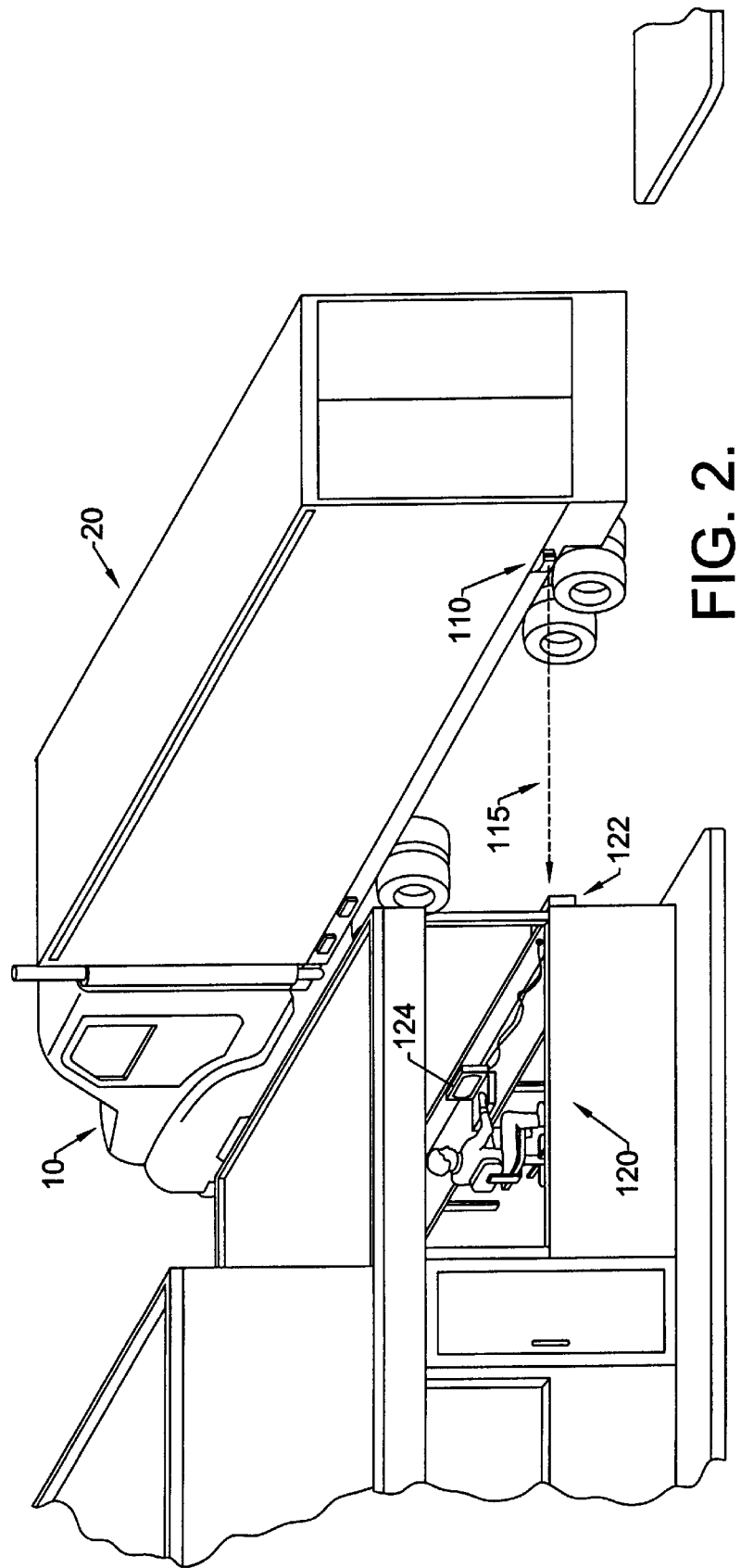
FIG. 2 graphically illustrates an embodiment of a vehicle identification system according to the present invention.

FIG. 2 graphically illustrates an embodiment of a vehicle identification system including a vehicle 5 comprising an ensemble of components 10, 20 and optical wavelength carrier communicating means 110 positioned on a component 20 of the ensemble, here a trailer. Optical wavelength carrier communicating means 110 produces an optical identification signal 115 representing an identity of the vehicle 5. The signal is preferably emitted through a transmitter having a header, vehicle identification data, and a check sum or verifier. Identity determining means 120 is positioned external to the vehicle 5. Identity determining means 120, here shown as including a receiver 122 and a console 124, determines an identity of the vehicle from the data of the optical identification signal 115 as understood by those skilled in the art.

Figure 3:
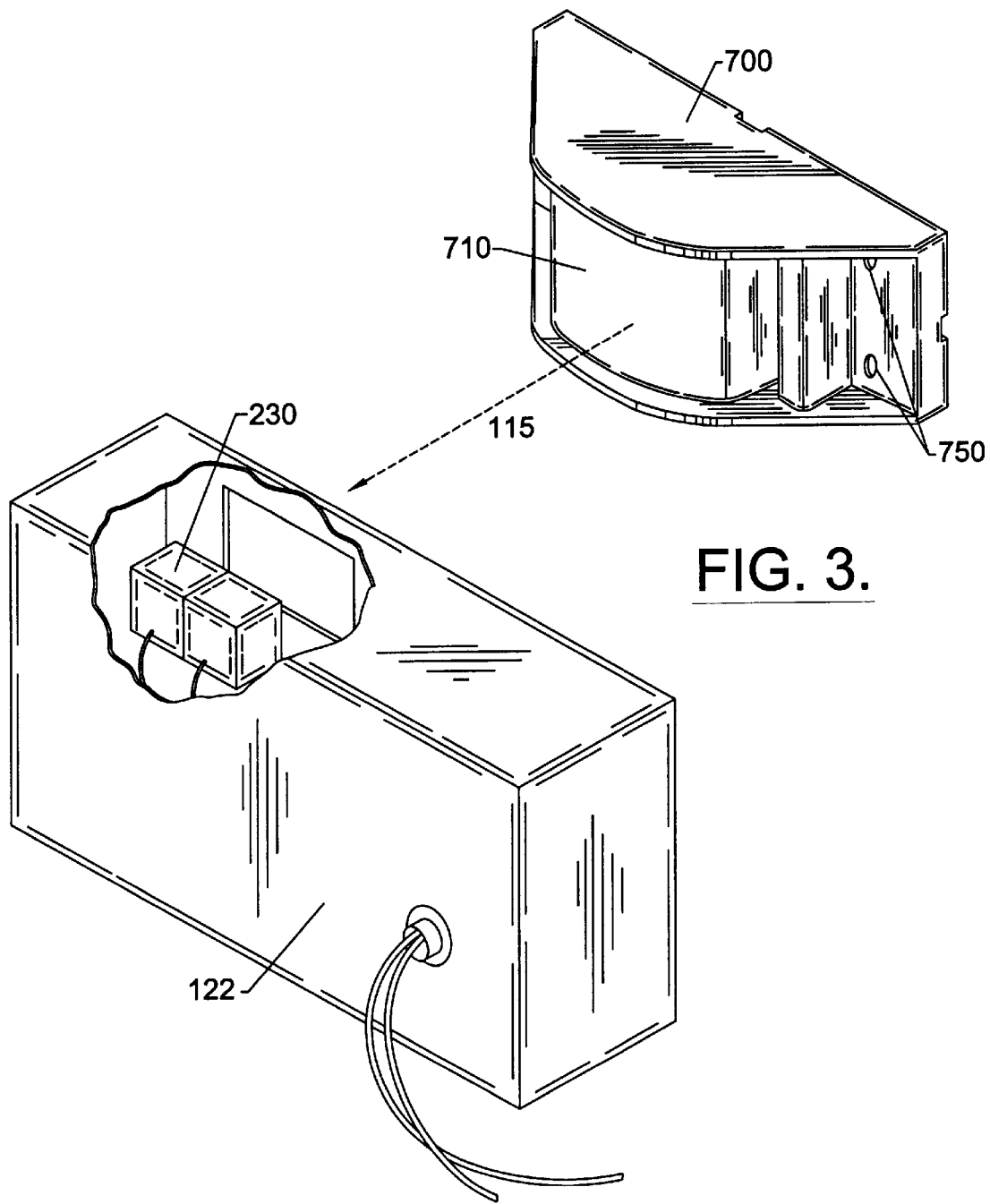
FIG. 3 graphically illustrates relationships between portions of a vehicle identification system according to an embodiment of the present invention.

FIG. 3 illustrates the relationship between optical wavelength carrier communicating means 110 and identity determining means 120 of FIG. 2 in greater detail. Optical wavelength carrier communicating means 110 is illustrated as concealed within an indicator 700 which may be mounted on the vehicle 5 using mounting means 750. The receiver 122 of identity determining means 120 includes optical receiving means 230. Optical receiving means 230 receives the optical identification signal 115 produced by optical wavelength carrier communicating means 110.

Optical identification signal 115 includes a carrier signal having a wavelength in the optical spectrum, a portion of the broader electromagnetic spectrum. The "*IEEE Standard Dictionary of Electrical and Electronic Terms,* ANSI/IEEE Std 100-1988, *Fourth Edition,*" published by the Institute of Electrical and Electronics Engineers, defines the "optical spectrum" as "generally, the electromagnetic spectrum within the wavelength region extending from the vacuum ultraviolet at 40 nanometers (nm) to the far infrared at 1 millimeter (mm)." Those skilled in the art will understand that such definitions are approximate and subject to change, and that "optical" as referred to herein generally also refers to signals having wavelengths in the portion of the electromagnetic spectrum for which communication techniques applicable in the visible spectrum are also applicable, including the use of photoemissive semiconductor materials to produce optical signals, line-of-sight transmission of optical signals through an atmospheric medium, the use of photosensitive semiconductor materials to detect optical signals, and the like. The optical spectrum is thus distinct from the radio frequency spectrum which generally includes signals having wavelengths greater than 1 millimeter and which is generally subject to communication regulations in the United States and elsewhere.

As an alternative, and although not preferred, a radio-frequency (RF) identification system could be used according to the present invention whereby a RF transmitter located on the rig sends identifying information to a receiver externally located to the rig, for example, in a weigh station or a cargo terminal control office. Although RF communication techniques may provide increased information capacity and detection range, several considerations may limit their practical applicability to tractor/trailer identification, and therefore such systems are not preferred. For example, RF communication systems generally require FCC approval, with transmitter and receiver design being subject to regulation, and generally such systems would have to compete with other users for an increasingly crowded RF spectrum. Moreover, RF systems can be vulnerable to electromagnetic interference, such as that produced by alternators or other electrical subsystems typically found on rigs. The interference problem may be exacerbated because identification typically is desired in staging areas such as weigh stations and cargo terminals where the presence of large numbers of rigs emitting RF signals may drastically increase interference. Minimizing interference and maintaining signal quality under these conditions may require stringent bandwidth and power limitations which may necessitate costly transmitter and receiver designs.

Figure 4:
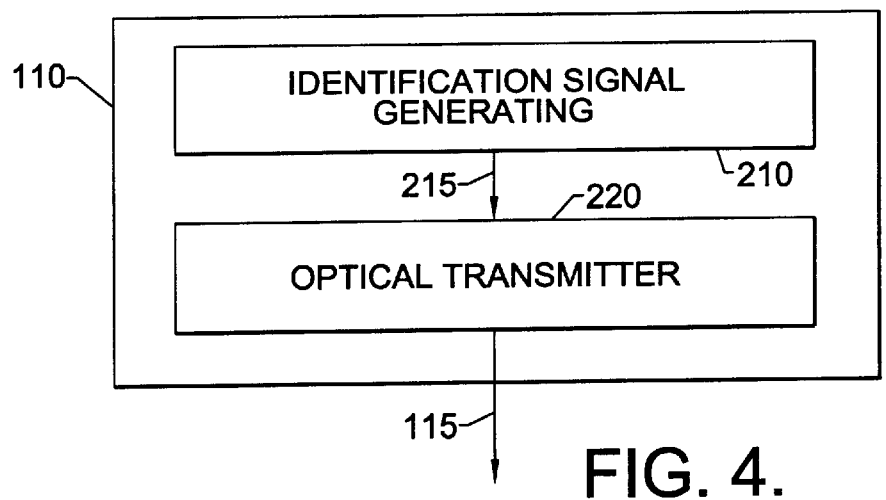
FIG. 4 illustrates operations for producing an optical identification signal according to an embodiment of the present invention.

FIG. 4 illustrates in detail functions of an optical wavelength carrier communicating means 110 according to the present invention. Optical wavelength carrier communicating means 110 includes identification signal generating means 210 for generating an identification signal 215 representing an identity of the vehicle 5. From the generated identification signal 215, an optical transmitter 220 produces an optical identification signal 115 representing an identity of the vehicle 5.

Figure 6:
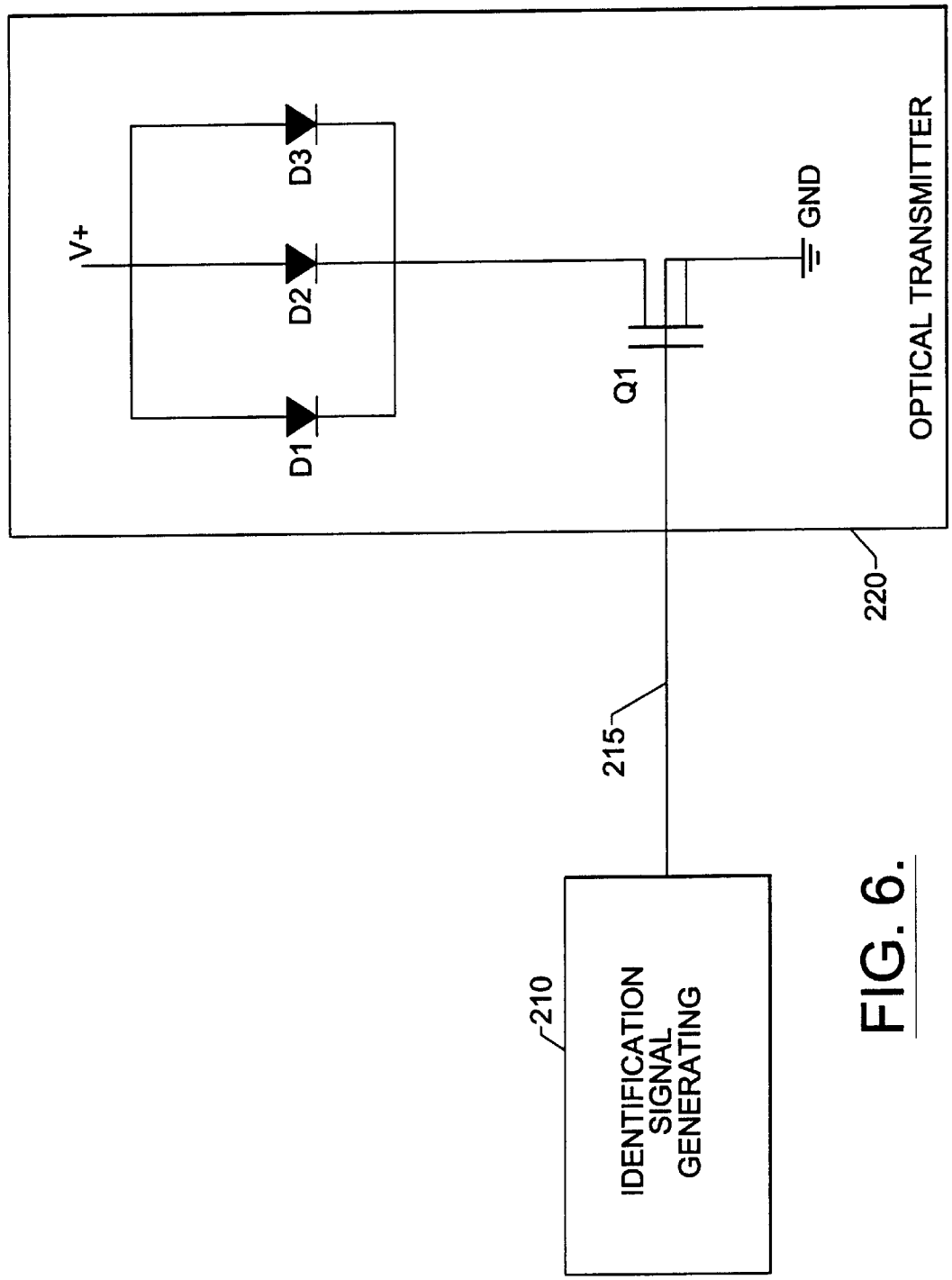
FIG. 6 illustrates a schematic of an electrical circuit which generates an identification signal and transmits an optical identification signal from the generated identification signal according to an embodiment of the present invention.

FIG. 6 is an electrical schematic diagram of an exemplary embodiment of identification signal generating means 210 and an optical transmitter 220 according to the present invention. Those skilled in the art will understand that the identification generating signal generating means 210 may include devices capable of producing an analog or digital signal for transmission by the optical transmitter 220, such as a microcontroller, programmable logic device (PLD), oscillator, and the like. Those skilled in the art will also understand that the identification may be generated using other hardware, software running in a general or special purpose computer on the vehicle, by a combination of software and hardware. The identification signal may, for instance, be a serial digital signal having a message format including multiple message structures and the like. Those skilled in the art will also understand that the optical identification signal may be communicated to the optical transmitter 420 using various communications techniques, such as those involving analog or digital transmission over twisted wire pairs, power line carrier, optical fiber, and the like.

The optical transmitter 220 is shown including a modulating transistor Q1 which modulates an array of optical emitting diodes D1–D3 to produce the optical identification signal 115. Preferably, each optical emitting diode D1–D3 is an infrared emitting diode producing an optical frequency carrier signal in the range of 700–1400 nanometers, i.e., the near infrared portion of the electromagnetic spectrum, similar to the inexpensive type of optical-emitting diode commonly used in smoke detectors. An example of such an optical-emitting diode is the LTE 4228U high-intensity Gallium Aluminum Arsenide optical emitting diode sold by Liteon, Inc. and as described in Liteon catalogs as understood by those skilled in the art, the specification of which is hereby incorporated by reference. Those skilled in the art will understand that any number of diodes such as the diodes D1–D3 illustrated may be used with the present invention, with the number depending on the amount of transmitted energy desired.

Those skilled in the art will understand that in the wavelength band from 700 to 1400 nanometers, water exhibits increased transmissivity and thus optical radiation emitted in this portion of the spectrum is less subject to attenuation under the conditions of fog, mist, and rain which are often encountered in tractor/trailer operations. Those skilled in the art will also understand that other types of optical emitters may be utilized with the present invention. Emitters with peak intensity in other "windows" of the optical spectrum may be used with the present invention, for example, diodes which emit carrier frequencies in the infrared atmospheric transmission bands at 3–5 micrometers and 8–12 micrometers wavelength. Those skilled in the art will also understand that although infrared emitting diodes such as those illustrated typically emit a non-coherent band of carrier signals concentrated within a portion of the infrared region of the electromagnetic spectrum, non-coherent emitters with differing spectral distributions and coherent emitters such as lasers and diodes may also be used with the present invention.

Figure 7:
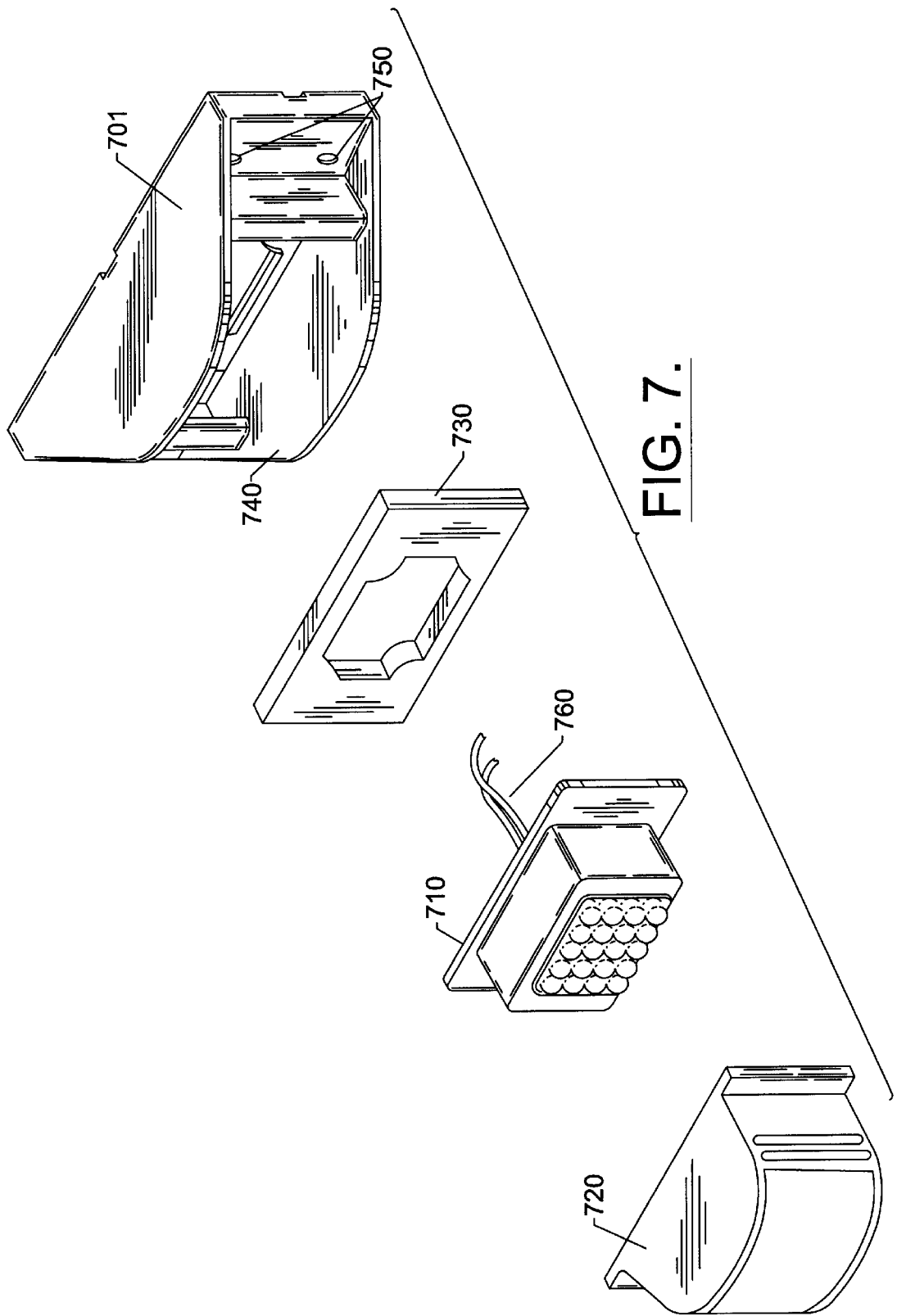
FIG. 7 illustrates an exploded view of a standard form factor indicator embodiment of the present invention.

FIG. 7 illustrates an embodiment of an indicator 700, including an indicator housing 701 having a standard truck light or truck indicator form factor (e.g., a lamp or marker), which preferably is used to conceal portions of optical wavelength carrier communicating means 110, including the optical transmitter 200, thus rendering the identification system less conspicuous on the exterior of a vehicle. This concealment also reduces attention being drawn to the transmitter so that theft of and damage to the transmitter are reduced. The indicator housing 701 retains the optical transmitter 220 within the indicator 700. The indicator housing 701 is here illustrated as including a sealed electronics package 710 which holds the optical transmitter 200, a transparent lens 720, and mounting base 740 which enclose the sealed electronics package 710 using an intervening foam gasket 730 to further isolate the sealed electronics package 710 from dirt and vibration. The indicator 700 includes means 750 for mounting the indicator 700 on a vehicle, here shown as holes for screws or bolts. Those skilled in the art will understand that the present invention may be used with a variety of other packaging arrangements which similarly conceal the optical wavelength carrier communicating means, preferably within a running light, clearance light, or other standardized form factor indicator commonly employed on the exterior of tractor/trailer rigs.

The indicator may include wires, terminals, or other features for providing electrical power and other signals to the optical wavelength carrier communicating means 110. For example, indicator 700 may include means 760 for electrically connecting optical transmitter 220 to a power bus, such as the power bus 30 illustrated in FIG. 1, such that electrical power and an identification signal 215 communicated over the bus may be conveyed to the optical transmitter 220.

The indicator housing 701 may retain both the identification signal generating means 210 and the optical transmitter 220 of the optical wavelength communicating means 110 of FIG. 4, or retain only the optical transmitter 200. For the first "Standalone ID Tag" embodiment, a tag is created which may used to identify the vehicle or component upon which it is mounted providing an easy and inexpensive retrofit for existing equipment. For example, an existing running or clearance light may be replaced by an indicator 700 having a similar form factor and which retains optical wavelength communicating means 110 and uses existing power connections.

Figure 5:
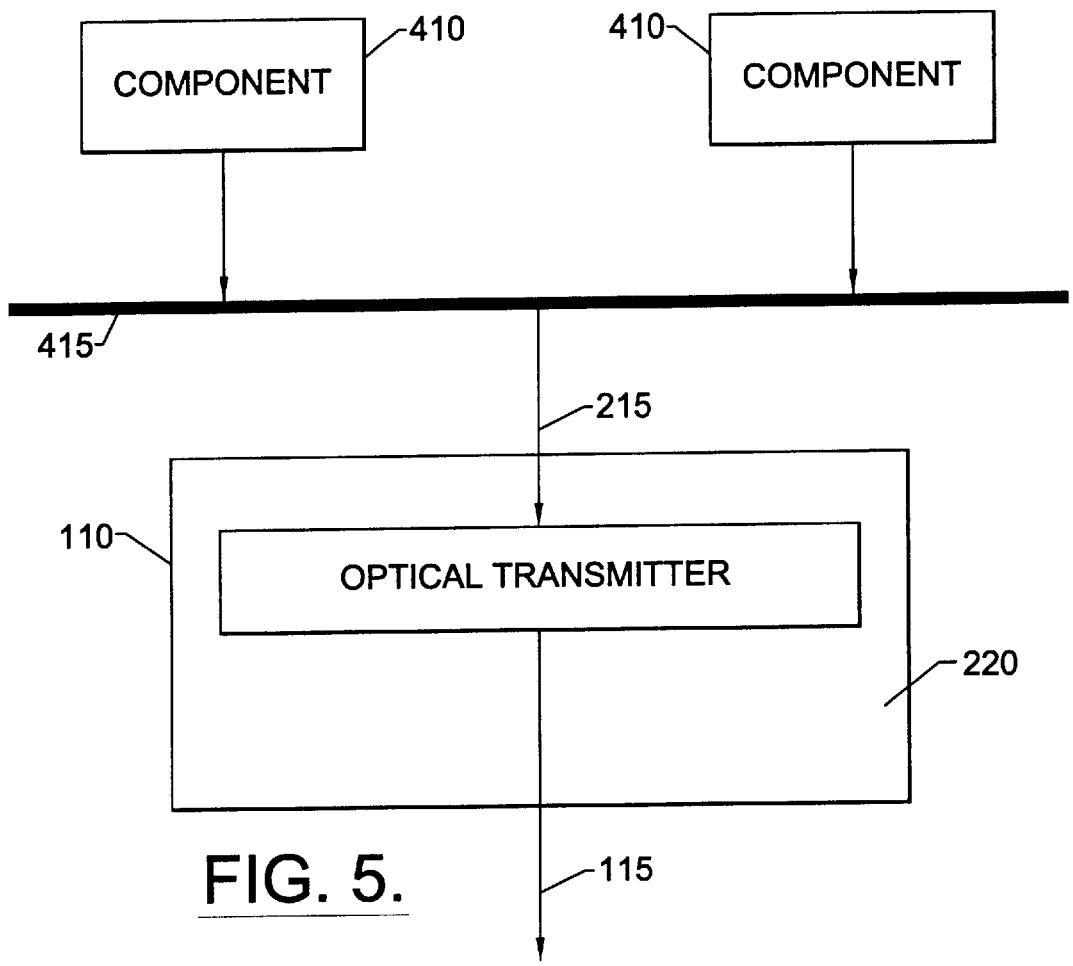
FIG. 5 illustrates a "Networked ID Tag" embodiment of the present invention.

For the second "Networked ID Tag" embodiment, as illustrated in the block diagram of FIG. 5, identification signal generating means 210 may be located within a component 410 of the vehicle, external to the indicator 700, and the identification signal 215 communicated to the optical transmitter 220 retained within the indicator 700 via a communications bus 415 such as an SAE J1708 bus, power bus, fiber optic bus, and the like. In this manner, a single optical transmitter 220 may produce multiple optical identification signals 115 from identification signals 215 generated by multiple identification signal generating means 215 located on different components 410.

Figure 8:
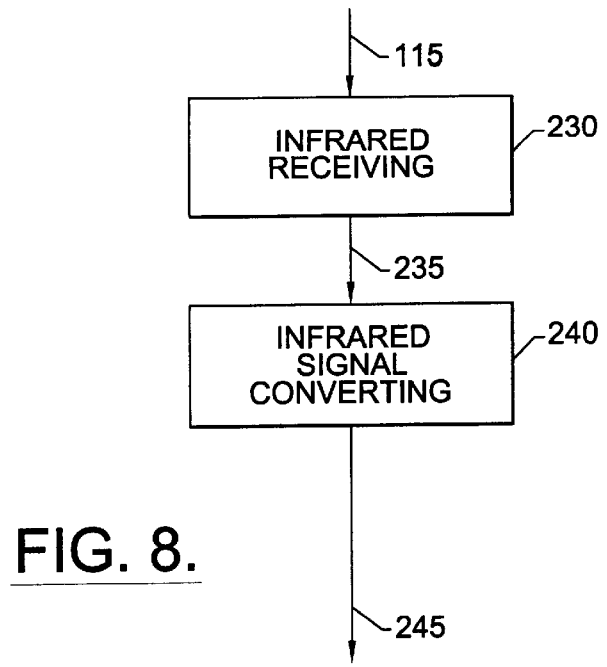
FIG. 8 illustrates operations for determining an identity of a vehicle from an optical identification signal according to an embodiment of the present invention.

FIG. 8 illustrates in greater detail identity determining means 120 for determining an identity of a tractor/trailer from an optical identification signal such as produced by the optical wavelength carrier communicating means 110 of FIGS. 2–7. Identity determining means 120 may include optical receiving means 230 for receiving the optical identification signal 115 produced by optical wavelength carrier communicating means 110. Optical signal converting means 240 converts the received optical identification signal 235 to produce a converted identification signal 245. Identification signal decoding means 250 decodes an identity 125 of the vehicle 5 from the converted identification signal 245.

Figure 9:
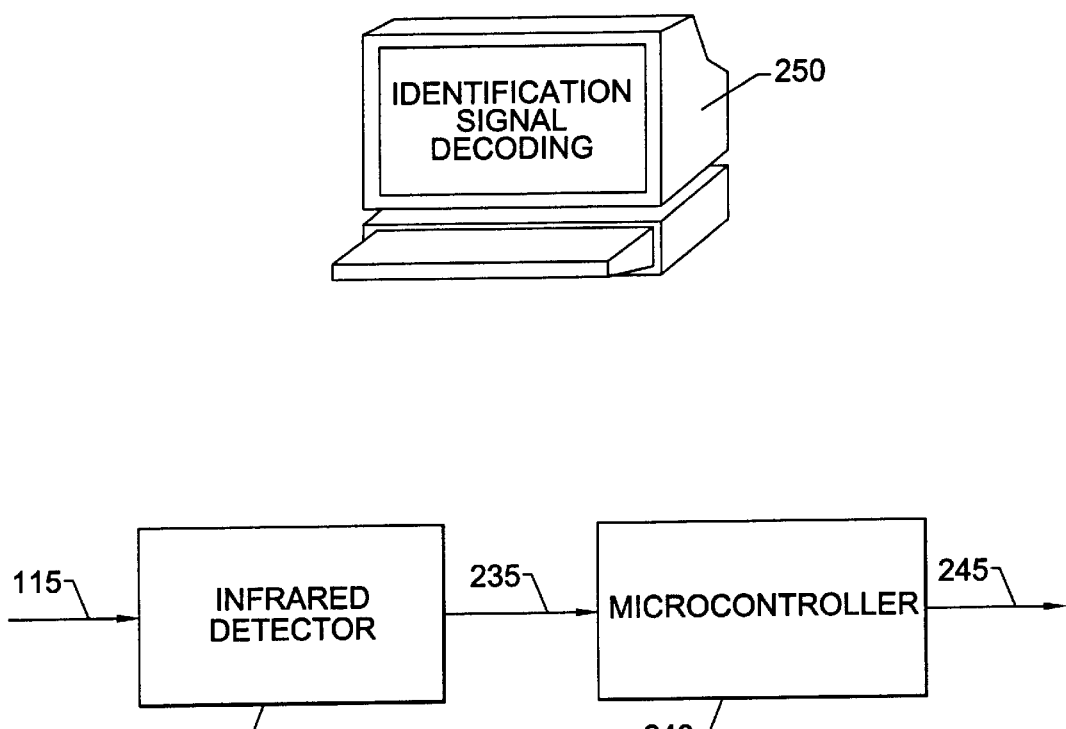
FIG. 9 illustrates operations for receiving an optical identification signal and converting the received signal according to the present invention.

FIG. 9 illustrates an exemplary embodiment of optical receiving means 230 and optical signal converting means 240. Optical receiving means 230 may include an infrared detector, preferably a detector exhibiting maximum sensitivity in the near infrared portion of the electromagnetic spectrum, in the region from approximately 700 nanometers to 1400 nanometers, approximately corresponding to the spectra of the infrared-emitting diodes discussed above. An example of such a detector is the LTM-8834-7 photodetector sold by Liteon, Inc., as described in Liteon catalogs as understood by those skilled in the art, the specification of which is hereby incorporated by reference.

Those skilled in the art will understand that many different types of optical detectors may be employed with the present invention. For example, the optical receiving means 230 may include photodiodes or phototransistors which exhibit peak sensitivities in other "windows" in the optical region of the electromagnetic spectrum. The optical receiving means 230 may also include various reticles, lenses, mirrors, filters, and the like which may modify the sensitivity, selectivity, and other parameters of receiving means 230.

As also illustrated in FIG. 9, the optical signal converting means 240 of FIG. 8 may include, for example, a microcontroller which converts the received optical identification signal 235 into a converted identification signal 245 for use by the identification signal decoding means 250 of FIG. 8. For example, the optical receiving means 230 may receive an optical identification signal 115 having a specified serial data format, and the received optical identification signal 235 may include a digital signal having the same serial format. The optical signal converting means 240 may convert the serial data signal into, for example, a standardized RS-232 data signal for input into a computer interface.

The decoding means 250 of FIG. 8 preferably includes communications interface software running on a personal computer or similar computing platform which interprets a data stream received from optical signal converting means 240, extracting identity information relating to the tractor/trailer. Such interface software is well-known to those skilled in the art and will not be discussed in detail herein. An example of such interface software is the Windows™-based Software Wedge™, marketed by T.A.L. Enterprises of Philadelphia, Pa., which can transfer serial data to a Windows™ application by emulating computer keyboard inputs or by acting as a Dynamic Data Exchange server under Windows™. For example, Software Wedge™ may be used to port the converted identification signal 245 to a spreadsheet program such as Microsoft's Excel™, as part of a freight management system. The Software Wedge is described further in the "*SoftwareWedge™ for Windows™*" software manual (e.g., Version 3.0 Professional Edition) which is hereby incorporated herein by reference and marketed by T.A.L Enterprises of Philadelphia, Pa.

In the drawings and specification, there have been disclosed typical preferred embodiments of the invention, and although specific terms are employed, they are used in a generic and descriptive sense only and not for purposes of limitation, the scope of the invention being set forth in the following claims.

That which is claimed:

1. A vehicle identification system, comprising:
    a vehicle comprising an electrical power bus which distributes electrical power to various electrical systems in the vehicle;
    optical wavelength carrier communicating means connected to said vehicle for producing an optical identification signal representing an identity of said vehicle, said optical identification signal including an optical wavelength carrier signal, wherein said optical wavelength carrier communicating means comprises:
        identification signal generating means for generating an identification signal representing an identity of said vehicle;
        identity communication means responsive to said identification signal generating means for communicating said identification signal over said power bus, wherein said identity communication means communicates said identification signal using spread spectrum techniques; and
        an optical transmitter, electrically connected to the power bus, for receiving electrical power and the identification signal and for producing an optical identification signal representing the identity of said vehicle from the received identification signal; and
    identity determining means positioned external to said vehicle and responsive to said optical wavelength carrier communicating means for determining an identity of said vehicle from said optical identification signal.

2. A system according to claim 1, wherein said optical wavelength carrier signal comprises an infrared wavelength carrier signal having a wavelength between approximately 770 nanometers and approximately 1400 nanometers.

3. A system according to claim 1, wherein said optical wavelength carrier signal comprises a near infrared wavelength carrier signal.

4. A system according to claim 1, wherein said identity determining means comprises:
    optical receiving means responsive to said optical wavelength carrier communicating means for receiving said optical identification signal;
    optical signal converting means responsive to said optical receiving means for converting the received optical identification signal to a converted identification signal; and
    identification signal decoding means for decoding the converted identification signal to thereby determine an identity of said vehicle.

5. A system according to claim 1, wherein said identity communication means communicates said identification signal across the power bus using a spread spectrum technique having frequencies in the range of 100–400 Khz such that the identification signal is communicated with reduced interference or suppression of the identification signal by other electromechanical systems.

6. A system according to claim 1, further comprising an indicator, said indicator including an indicator housing which retains said optical transmitter within said indicator housing and means for mounting said indicator on said vehicle.

7. A system according to claim 6, wherein said indicator housing comprises an indicator housing having a standard truck light form factor such that said optical transmitter is concealed within said housing.

8. A system according to claim 6, wherein said vehicle comprises an ensemble of components, wherein said identification signal generating means comprises means for generating an identification signal representing an identity of one component of said ensemble, and wherein said indicator comprises an indicator positioned on said one component.

9. A method for identifying a vehicle, wherein the vehicle includes an optical wavelength carrier communicator comprising an identification signal generator and an optical transmitter positioned on the vehicle, wherein the vehicle further includes an electrical power bus which distributes electrical power to various electrical systems in the vehicle, and wherein the method comprising the steps of:
    producing an optical identification signal representing an identity of the vehicle from the optical wavelength carrier communicator, the optical identification signal comprising an optical wavelength carrier signal, wherein the step of producing an optical identification signal comprises the steps of:
        generating an identification signal representing the identity of the vehicle in the identification signal generator;
        communicating the generated identification signal over the power bus to the optical transmitter using spread spectrum techniques; and producing the optical identification signal from the communicated identification signal in the optical transmitter; and determining an identity of the vehicle from the optical identification signal external to the vehicle.

10. A method according to claim 9, wherein the step of producing an optical identification signal comprises the step of producing an optical identification signal including an infrared wavelength carrier signal having a wavelength between approximately 770 nanometers and approximately 1400 nanometers.

11. A method according to claim 9, wherein the step of producing an optical identification signal comprises the step of producing an optical identification signal including a near infrared wavelength carrier signal.

12. A method according to claim 9, wherein said communicating step comprises communicating said identification signal across the power bus using a spread spectrum technique having frequencies in the range of 100–400 Khz such that the identification signal is communicated with reduced interference or suppression of the identification signal by other electromechanical systems.

13. A vehicle identification system for communicating to a remote location identity information pertaining to a vehicle, wherein said system comprises:

a vehicle having front and rear ends and side panels spanning between the front and rear ends; and optical wavelength carrier communicating means mounted to at least one of said side panels of said vehicle for producing an optical identification signal representing identity information pertaining to the vehicle, wherein said optical wavelength carrier communicating means is positioned on said side panels so as to facilitate the transmission of the identity information in a lateral direction outward from said side panel to the remote location.

14. A system according to claim 13 further comprising identity determining means positioned external to said vehicle and responsive to said optical wavelength carrier communicating means for determining an identity of said vehicle from said optical identification signal.

15. A system according to claim 14, wherein said identity determining means comprises:

optical receiving means responsive to said optical wavelength carrier communicating means for receiving said optical identification signal;

optical signal converting means responsive to said optical receiving means for converting the received optical identification signal to a converted identification signal; and identification signal decoding means for decoding the converted identification signal to thereby determine an identity of said vehicle.

16. A system according to claim 13, wherein said optical wavelength carrier communicating means produces an optical wavelength carrier signal containing the optical identification signal.

17. A system according to claim 16, wherein said optical wavelength carrier communicating means produces an infrared wavelength carrier signal having a wavelength between approximately 770 nanometers and approximately 1400 nanometers.

18. A system according to claim 16, wherein said optical wavelength carrier communicating means produces a near infrared wavelength carrier signal.

19. A system according to claim 13, wherein said optical wavelength carrier communicating means comprises:

identification signal generating means for generating an identification signal representing an identity of said vehicle; and an optical transmitter responsive to said identification signal generating means which produces an optical identification signal representing an identity of said vehicle from the generated identification signal.

20. A system according to claim 19, wherein said vehicle comprises an ensemble of components, wherein said identification signal generating means comprises means for generating an identification signal representing an identity of one component of said ensemble, wherein said optical transmitter produces an optical identification signal representing an identity of said one component of said ensemble.

21. A system according to claim 19, further comprising an indicator, said indicator including an indicator housing which retains said optical transmitter within said indicator housing and means for mounting said indicator on the side panels of said vehicle.

22. A system according to claim 21, wherein said vehicle comprises a truck having a tractor and a trailer mechanically connected the tractor.

23. A system according to claim 22, wherein said indicator comprises an indicator housing having a standard truck light form factor consistent with a tractor/trailer vehicle such that said optical transmitter is concealed within said indicator housing and can be located on the side panels of said truck.

24. A system according to claim 21, wherein said vehicle further comprises an electrical power bus which distributes electrical power and communicating means responsive to said identification signal generating means for communicating said identification signal over said power bus, and wherein said indicator comprises means for electrically connecting said optical transmitter to said power bus to thereby convey electrical power and the communicated identification signal to said optical transmitter.

25. A system according to claim 24, wherein said communication means communicates said identification signal across the power bus using a spread spectrum technique having frequencies in the range of 100–400 Khz such that the identification signal is communicated with reduced interference or suppression of the identification signal by other electromechanical systems.

26. A stand-alone vehicle identification indicator for communicating to a remote location identity information pertaining to a vehicle independent of a data communication link with the vehicle, wherein said indicator comprises:

indicator housing including means for mounting said indicator on the vehicle, herein said indicator housing has a standard vehicle light form factor consistent with existing lights of the vehicle such that said indicator housing can replace an existing light of the vehicle in an inconspicuous manner; and optical wavelength carrier communicating means located in said indicator housing, wherein said optical wavelength carrier communicating means internally generates an identification signal representing an identity of the vehicle and transforms the identification signal into an optical identification signal for transmission to the remote location, wherein said optical wavelength carrier communicating means generates the identification signal independent of a data communication link with the vehicle, such that the vehicle identification indicator is stand-alone and does not require a data communication link between the vehicle and the stand-alone vehicle identification indicator.

27. A system according to claim 26, wherein the vehicle comprises a truck having a tractor and a trailer mechanically connected the tractor, and wherein said indicator housing has a standard truck light form factor consistent with a tractor/trailer vehicle such that said indicator can replace an existing light on said truck.

28. A system according to claim 26, wherein said optical wavelength carrier communicating means comprises:

identification signal generating means for generating an identification signal representing an identity of said vehicle; and an optical transmitter responsive to said identification signal generating means which produces an optical identification signal representing an identity of said vehicle from the generated identification signal.

29. A system according to claim 28, wherein said vehicle comprises an ensemble of components, wherein said identification signal generating means comprises means for generating an identification signal representing an identity of one component of said ensemble, wherein said optical transmitter produces an optical identification signal representing an identity of said one component of said ensemble.

30. A system according to claim 26 further comprising identity determining means positioned external to said vehicle and responsive to said optical wavelength carrier communicating means for determining an identity of said vehicle from said optical identification signal.

31. A system according to claim 30, wherein said identity determining means comprises:

optical receiving means responsive to said optical wavelength carrier communicating means for receiving said optical identification signal;

optical signal converting means responsive to said optical receiving means for converting the received optical identification signal to a converted identification signal; and identification signal decoding means for decoding the converted identification signal to thereby determine an identity of said vehicle.

32. A system according to claim 26, wherein said optical wavelength carrier communicating means produces an optical wavelength carrier signal containing the optical identification signal.

33. A system according to claim 32, wherein said optical wavelength carrier communicating means produces an infrared wavelength carrier signal having a wavelength between approximately 770 nanometers and approximately 1400 nanometers.

34. A system according to claim 32, wherein said optical wavelength carrier communicating means produces a near infrared wavelength carrier signal.

* * * * *

UNITED STATES PATENT AND TRADEMARK OFFICE
CERTIFICATE OF CORRECTION

PATENT NO. : 6,111,524
DATED : August 29, 2000
INVENTOR(S) : Lesesky et al.

It is certified that error appears in the above-identified patent and that said Letters Patent is hereby corrected as shown below:

Column 12, line 50, "herein" should read --wherein--.

Signed and Sealed this

Seventeenth Day of April, 2001

*Attest:*

NICHOLAS P. GODICI

*Attesting Officer*      *Acting Director of the United States Patent and Trademark Office*